US010897191B2

(12) United States Patent
Liu

(10) Patent No.: US 10,897,191 B2
(45) Date of Patent: Jan. 19, 2021

(54) INTEGRATED CIRCUIT FOR REALIZING ZERO POWER CONSUMPTION STANDBY, OF SWITCHING POWER SUPPLY

(71) Applicant: Ming Liu, Guangdong (CN)

(72) Inventor: Ming Liu, Guangdong (CN)

( * ) Notice: Subject to any disclaimer, the term of this patent is extended or adjusted under 35 U.S.C. 154(b) by 0 days.

(21) Appl. No.: 16/655,967

(22) Filed: Oct. 17, 2019

(65) Prior Publication Data

US 2020/0052578 A1 Feb. 13, 2020

Related U.S. Application Data

(63) Continuation-in-part of application No. PCT/CN2018/083346, filed on Apr. 17, 2018.

(30) Foreign Application Priority Data

Apr. 17, 2017 (CN) .......................... 2017 1 0247971

(51) Int. Cl.
*H02M 1/36* (2007.01)
*H02M 7/217* (2006.01)
*H02M 1/00* (2006.01)

(52) U.S. Cl.
CPC ............. *H02M 1/36* (2013.01); *H02M 7/217* (2013.01); *H02M 2001/0032* (2013.01)

(58) Field of Classification Search
CPC ...................................................... H02M 1/36
See application file for complete search history.

(56) References Cited

U.S. PATENT DOCUMENTS

| 7,034,604 B2 * | 4/2006 | Minteer .................. G06F 1/266 327/531 |
| 8,901,771 B2 * | 12/2014 | Mancebo del Castillo Pagola ..... H02M 5/42 307/64 |
| 9,774,263 B1 * | 9/2017 | Chen ................... H02M 3/3378 |
| 2013/0336031 A1 | 12/2013 | McCune |

FOREIGN PATENT DOCUMENTS

| CN | 101419434 A | 4/2009 |
| CN | 102594126 A | 7/2012 |
| CN | 202759375 U | 2/2013 |
| CN | 105429486 A | 3/2016 |
| CN | 106849700 A | 6/2017 |
| WO | WO 2018/192485 A1 | 10/2018 |

OTHER PUBLICATIONS

International Search Report and Written Opinion with English translation, dated Jul. 17, 2018, corresponding to International Application No. PCT/CN2018/083346, 10 pp.

\* cited by examiner

*Primary Examiner* — Hai L Nguyen
(74) *Attorney, Agent, or Firm* — W&K IP

(57) ABSTRACT

An integrated circuit for realizing a zero power consumption standby of switching power supply is disclosed, including a zero-power-consumption controller for controlling the switching power supply. The zero-power-consumption controller comprises a charge coupled circuit, a zero-power-consumption microprocessor, and a zero-power-consumption voltage regulation circuit, and an input from an AC power source is sequentially fed into the zero-power-consumption voltage regulation circuit and the zero-power-consumption microprocessor via the charge coupled circuit.

20 Claims, 6 Drawing Sheets

INTEGRATED CIRCUIT FOR REALIZING ZERO POWER CONSUMPTION STANDBY, OF SWITCHING POWER SUPPLY

CROSS-REFERENCE TO RELATED APPLICATIONS

This application is a continuation-in-part application based on PCT Application PCT/CN2018/083346, filed on Apr. 17, 2018, entitled "Integrated Circuit, for Realizing Zero Power Consumption Standby of Switching Power Supply", which claims priority to Chinese Application 20171024797.X, filed on Apr. 17, 2017, the contents of which are incorporated herein by reference in their entirety.

TECHNICAL FIELD

The present disclosure pertains to the technical field of microelectronics, and in particular to an integrated circuit for realizing a zero power consumption standby of a switching power supply.

BACKGROUND OF INVENTION

A switching power supply is used by almost all electrical equipment due to its advantages such as high efficiency, low cost, small size, and light weight. However, all the conventional starting (activating) power sources of switching power supply implement the startup of the switching power supply by using a power-consuming resistor-based starting circuit (as shown in FIG. 1), a power-consuming capacitor-based starting circuit (as shown in FIG. 2), a starting circuit in which a chip of the switching power supply sinks a current from a drain of an internal power field effect transistor MOSFET to charge a Vdd storage capacitor (as shown in FIG. 3), a high-voltage depletion-type field effect transistor-based starting circuit (as shown in FIG. 4), and the like.

However, these starting circuits still consume electric energy before or after the switching power supply is started and when the operation of the power supply is completely stopped, thus not only the efficiency of the power supply is affected, but also it is impossible for the power supply to consume very low power during standby, and complete zero power consumption or slight power consumption during standby is more impossible to be achieved. Therefore, since the switching power supply fails to achieve zero power consumption during standby, various electrical appliances and devices using such switching power supplies also fail to achieve zero power consumption during standby.

SUMMARY OF THE INVENTION

In order to solve the technical problem that the power consumption during standby of the existing switching power supply cannot be reduced to zero power consumption, an embodiment of the present disclosure provides an integrated circuit for realizing a zero power consumption standby of switching power supply, comprising a zero-power-consumption controller configured to control the switching power supply. The zero-power-consumption controller comprises a charge coupled circuit, a zero-power-consumption microprocessor, and a zero-power-consumption voltage regulation circuit, and an input from an AC power source is sequentially fed into the zero-power-consumption voltage regulation circuit and the zero-power-consumption microprocessor via the charge coupled circuit.

In a technical solution of the present disclosure, an alternating current charge may be inputted by using only one capacitor C1, a first terminal of the AC power source is connected, via the capacitor C1, to a junction between one pair of two pairs of MOS transistors in the zero-power-consumption controller, a junction between the other pair of MOS transistors is floated, a second terminal of the AC power source is connected directly to a ground terminal of the zero-power-consumption controller, and only one diode is used for high voltage rectification of the switching power supply (the second terminal is correspondingly a terminal N when the first terminal is a terminal L; and the second terminal is correspondingly the terminal L when the first terminal is the terminal N);

when the power supply is energized, since a Vdd voltage has not been established, the two pairs of MOS transistors are all in an OFF state; during a positive half cycle of an alternating current, a positive charge of the first terminal of the AC power source flows through the capacitor C1 into a p-type active region and an n-well of a MOS transistor M1 in the zero-power-consumption controller, and then flows into a Vdd storage capacitor C3, and finally flows back to the second terminal of the AC power source to charge the Vdd storage capacitor C3;

during a negative half cycle of the alternating current, a negative charge of the first terminal of the AC power source flows through the capacitor C1 into an n-type active region and a p-well of the MOS transistor M3 in the zero-power-consumption controller, and then flows back to the second terminal of the AC power source;

charging of the capacitor C3 by the capacitor C1 is enabled by controlling the MOS transistor M3 and the MOS transistor M4 to be turned OFF, and the charging of the capacitor C3 by the capacitor C1 is disabled by causing the MOS transistor M3 and the MOS transistor M4 to be turned ON and connected in parallel to the two terminals of the AC power source;

in a case where the zero-power-consumption controller controls the MOS transistor M3 and the MOS transistor M4 to be switched from OFF to ON, a drain voltage of transistors M3 and M4 drops only from Vdd to 0V; or when the MOS transistor M3 and the MOS transistor M4 are controlled to be switched from ON to OFF, the drain voltage rises only from 0V to Vdd.

Further, in another solution of the present disclosure, both a capacitor C1 and a capacitor C2 are included in the present disclosure, the two terminals of the AC power source are respectively connected with junctions of the two pairs of MOS transistors in the zero-power-consumption controller via the two capacitors C1 and C2 of the charge coupled circuit; when the power source is energized, since a Vdd voltage has not been established, the two pairs of MOS transistors are all in an OFF state; during a positive half cycle of an alternating current, a positive charge of the first terminal of the AC power source flows through the capacitor C1 into a p-type active region and an n-well of the MOS transistor M1 in the zero-power-consumption controller, then flows into the Vdd storage capacitor C3, and finally flows back to the second terminal of the AC power source via a p-well and an n-type active region of the MOS transistor M4 to charge the Vdd storage capacitor C3;

during a negative half cycle of the alternating current, a positive charge of the second terminal of the AC power source flows through the capacitor C2 into a p-type active region and an n-well of the MOS transistor M2 in the zero-power-consumption controller, then flows into the Vdd storage capacitor C3, and then flows back to the first terminal of the AC power source via a p-well and an n-type active region of the MOS transistor M3 to charge the Vdd storage capacitor C3;

charging of the capacitor C3 by C1 and C2 connected in series is enabled by controlling the MOS transistor M3 and the MOS transistor M4 to be turned OFF, and the charging of the capacitor C3 by the capacitors C1 and C2 connected in series is disabled by causing the MOS transistor M3 and the MOS transistor M4 to be turned ON and connected in parallel to the two terminals of the AC power source;

in a case where the zero-power-consumption controller controls the MOS transistor M3 and the MOS transistor M4 to be switched from OFF to ON, a drain voltage of the transistors M3 and M4 drops only from Vdd to 0V; or when the MOS transistor M3 and the MOS transistor M4 are controlled to be switched from ON to OFF, the drain voltage rises only from 0V to Vdd.

In the case where only the capacitor C1 is used or both of the capacitors C1 and C2 are used, during operation, voltage stabilization control is performed by the zero-power-consumption voltage regulator in the zero-power-consumption controller by the MOS transistor M3 and the MOS transistor M4 constituting a closed loop; when the Vdd voltage reaches a set value of the zero-power-consumption controller, the zero-power-consumption microprocessor performs overvoltage detection, undervoltage detection, overload detection, and overtemperature detection, an instruction is sent by the zero-power-consumption controller to start the switching power supply if no abnormality is found, and the switching power supply is immediately controlled by the zero-power-consumption microprocessor to stop operating if the zero-power-consumption microprocessor detects one or more abnormalities or detects that the output of the switching power supply is unloaded; in the case where the switching power supply stops operating, the abnormal parameters are accessed and monitored periodically, and the normal operation of the switching power supply is resumed immediately if the respective parameters are found to return to normal.

In the case where only the capacitor C1 is used, when the switching power supply is started normally and brought into an operating state and supplies power to a load, a Vdd winding T1_Na of a transformer of the switching power supply supplies power to the Vdd storage capacitor C3 via an external diode, the zero-power-consumption voltage regulator controls the MOS transistor M3 and the MOS transistor M4 to be turned ON, and the capacitor C1 and the junction between one pair of the two pairs of MOS transistors are connected with the ground terminal of the zero-power-consumption controller circuit, so that the charging of the Vdd storage capacitor by the capacitor C1 is stopped, and the Vdd voltage is supplied and maintained by the Vdd winding of the switching power supply; because the MOS transistor M3 and the MOS transistor M4 have a resistance at a milliohm-scale in the ON state, the phase of an alternating current i in a pure capacitor circuit of capacitor C1 is in advance of the phase of an AC voltage v across its both ends by 90°, with an active power P=iv cos $\varphi$=iv cos 90°=0, where $\varphi$ represents a phase angle, therefore the current flowing through the capacitor C1 is a reactive current, by which no electric energy is consumed.

In the case where the capacitors C1 and C2 are used, when the switching power supply is started normally and brought into an operating state and supplies power to a load, a Vdd winding T1_Na of a transformer of the switching power supply supplies power to the Vdd storage capacitor C3 via an external diode, the zero-power-consumption voltage regulator controls the MOS transistor M3 and the MOS transistor M4 to be turned ON, and the capacitors C1 and C2 and the junctions of the two pairs of MOS transistors are connected with the ground terminal of the zero-power-consumption controller circuit, so that the charging of the Vdd storage capacitor by the capacitors C1 and C2 is stopped, and the Vdd voltage is supplied and maintained by the Vdd winding of the switching power supply; because the MOS transistor M3 and the MOS transistor M4 have a resistance at a milliohm-scale in the ON state, the capacitors C1 and C2 are physically pure capacitors connected directly in series which are connected in parallel to the terminals L and N of the AC power source, and the phase of an alternating current i in a pure capacitor circuit with the capacitors C1 and C2 connected in series is in advance of the phase of an AC voltage v across its both ends by 90°, with an active power P=iv cos $\varphi$=iv cos 90°=0, where $\varphi$ represents a phase angle, therefore the current passing through the capacitors C1 and C2 is a reactive current, by which no electric energy is consumed.

The zero-power-consumption controller can establish a voltage source using the zero-power-consumption voltage regulation circuit as needed regardless of whether the switching power supply is in an operating state or a shut-down state, so that the zero-power-consumption controller can manage the entire switching power supply.

When no load is detected, the switching power supply is immediately shut down by the zero-power-consumption microprocessor, so that the switching power supply maintains an original output voltage while consuming no power completely; the switching power supply is started periodically based on a discharge time constant in a no-load state of an output capacitor of the switching power supply and based on a requirement for accuracy of stabilization of an output voltage in the no-load state so as to supplement the lost charges to the output capacitor to maintain a constant voltage at the output terminal; in this way, the switching power supply stops operating for a long time at a second-scale, whereas the switching power supply is started for supplementing charges to the output capacitor for a very short time at a millisecond-scale, and the switching power supply is substantially in a non-operated state, therefore the entire switching power supply consumes almost zero power on average, and thus zero power consumption is achieved when the switching power supply is in a no-load standby state.

A high-voltage MOS transistor M0 controlled by the zero-power-consumption controller is further included in the present disclosure, wherein the high-voltage MOS transistor M0 is operatively linked to the switching power supply;

the incorporation of the transistor M0 allows the zero-power-consumption circuit of the present disclosure to maintain a voltage across the Vdd storage capacitor; each time the switching power supply is started, the transistor M0 is enabled so that a high voltage rectifier charges a high-voltage filter capacitor of the switching power supply, where the voltage U(t) across the high voltage capacitor=U^(-t/$\tau$), $\tau$ is a RC time constant, and t represents time; a gate of the high-voltage MOS transistor of the switching power supply is driven immediately without need of waiting for charging of Vdd upon the switching power supply is started immediately, and a high voltage across a drain of the MOS transistor should increase exponentially according to the above formula, so that real soft startup can be achieved each time the switching power supply is started, and parameters related to the soft startup can be set by adjusting the RC time constant.

The MOS transistors M1 and M2 can be replaced with any other unidirectionally conductive electronic component, as long as the directions of the p-type semiconductors and the n-type semiconductors are consistent with those described in this technical solution.

An embodiment of the present disclosure also provides another integrated circuit for realizing a zero power consumption standby of switching power supply, comprising a zero-power-consumption controller configured to control the switching power supply, wherein the zero-power-consumption controller comprises a charge coupled circuit, a zero-power-consumption microprocessor, a zero-power-consumption voltage regulation circuit, and a switching power supply condition detector, wherein an AC power source is connected with the charge coupled circuit, the charge coupled circuit is connected with the zero-power-consumption voltage regulation circuit, the voltage regulation circuit is connected with the zero-power-consumption microprocessor, the zero-power-consumption microprocessor is connected with the switching power supply condition detector, the switching power supply condition detector is connected with the switching power supply, and an input from the AC power source is sequentially fed into the zero-power-consumption voltage regulation circuit, the zero-power-consumption microprocessor, and the switching power supply condition detector via the charge coupled circuit.

The charge coupled circuit comprises a first capacitor and a third capacitor, the zero-power-consumption voltage regulation circuit comprises a first pair of MOS transistors, a second pair of MOS transistors, a zero-power-consumption voltage regulator, and a source of reference voltage, the first pair of MOS transistors comprises a first MOS transistor and a third MOS transistor, the second pair of MOS transistors comprises a second MOS transistor and a fourth MOS transistor, a first terminal of the AC power source is connected with one end of the first capacitor, the other end of the first capacitor is connected with a junction between the first pair of MOS transistors, a junction between the second pair of MOS transistors is floated, a second terminal of the AC power source is connected with a ground wire of the zero-power-consumption controller via the third capacitor, the zero-power-consumption controller is configured to be connected with the switching power supply, the third capacitor is connected sequentially to a first diode and a winding of a transformer of the switching power supply, and the source of reference voltage is connected with the zero-power-consumption microprocessor.

The switching power supply comprises a high-voltage filter capacitor.

The charge coupled circuit further comprises a second capacitor, wherein one end of the second capacitor is connected with the terminal N of the AC power source, and the other end of the second capacitor is connected with the junction between the second MOS transistor and the fourth MOS transistor.

The integrated circuit for realizing a zero power consumption standby of switching power supply further comprises a high-voltage MOS transistor and a rectifier, wherein the rectifier is connected with the high-voltage MOS transistor, the high-voltage MOS transistor is also connected with the high-voltage filter capacitor, and the high-voltage MOS transistor is also connected with the switching power supply.

Moreover, the switching power supply with zero power consumption during standby according to the present disclosure has a broad prospect of popularization and application: it not only saves unnecessary economic waste for people. Because each family has a dozen to dozens of devices of various sizes that consume electricity even during standby, the total amount of power consumption in society is enormous when calculated in terms of more than one billion people in China and several billions of people in the world. When all the devices are changed into eco-friendly devices that do not waste electric energy during standby, it is possible for people to build less power plants and combust a less amount of coal and oil (in tons), carbon dioxide emissions can be greatly reduced, and safety accidents can be greatly reduced, which has been excepted by people for a long time. It is believed that the standard of power consumption during standby in China and in the world can be advanced to the highest level "0" by popularization and use of this invention.

BRIEF DESCRIPTION OF THE DRAWINGS

The present disclosure will be described in more detail below with reference to the accompanying drawings and specific embodiments, and the advantages of the above or of other aspects of the present disclosure will become more apparent therefrom.

DETAILED DESCRIPTION OF THE INVENTION

The present disclosure will be further described below with reference to the accompanying drawings and embodiments.

An embodiment of the present disclosure provides an integrated circuit for realizing a zero power consumption standby of switching power supply, which comprises a zero-power-consumption controller configured to control the switching power supply.

Figure 6:
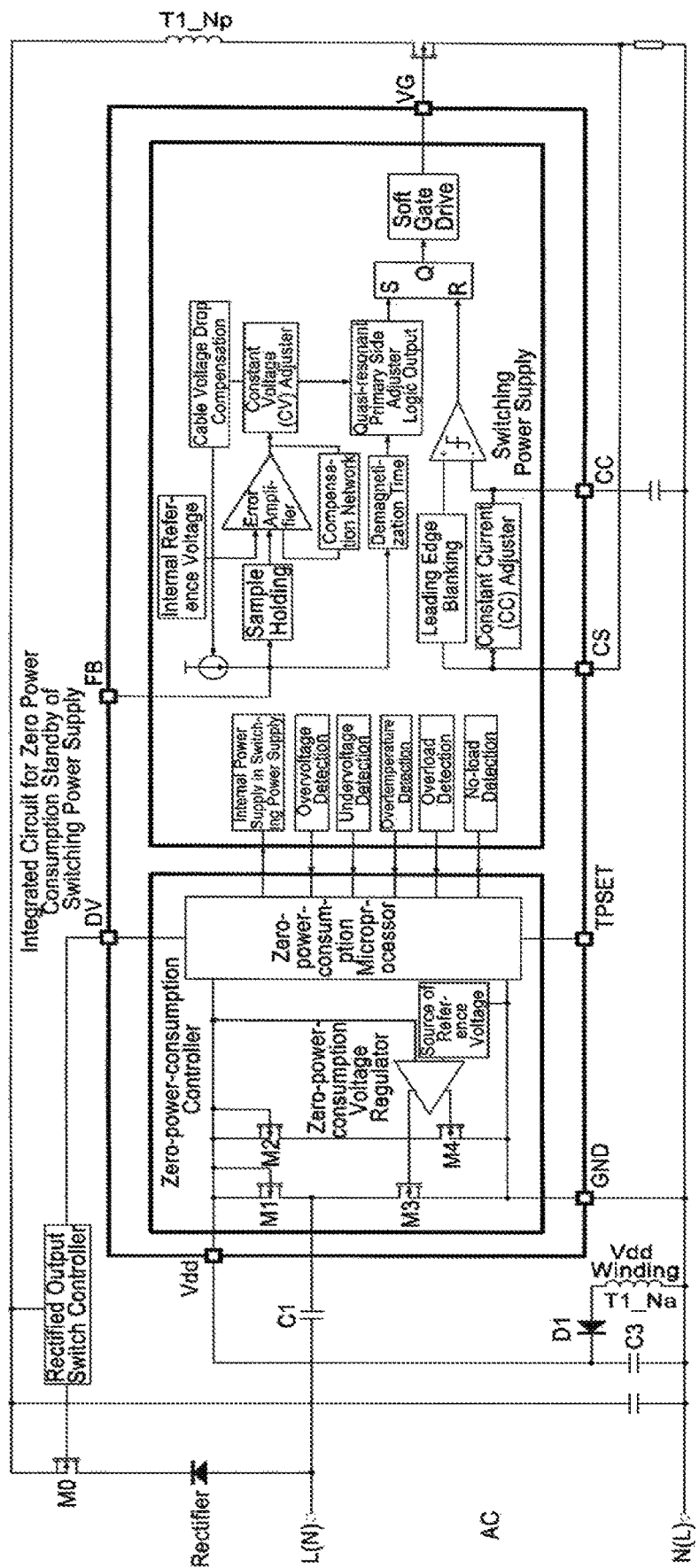
FIG. 6 is a circuit diagram of another implementation according to an embodiment of the present disclosure.

As shown in FIG. 6, the zero-power-consumption controller comprises a charge coupled circuit, a zero-power-consumption microprocessor, and a zero-power-consumption voltage regulation circuit, and an input from an AC (alternating current) power source is sequentially fed into the zero-power-consumption voltage regulation circuit, the zero-power-consumption microprocessor, and a switching power supply condition detector via the charge coupled circuit.

The charge coupled circuit comprises capacitors C1 and C3 or capacitors C1, C2, and C3.

The zero-power-consumption voltage regulation circuit includes two pairs of MOS transistors, a zero-power-consumption voltage regulator, and a source of reference voltage.

The two pairs of MOS transistors are a MOS transistor M1 and a MOS transistor M3, and a MOS transistor M2 and a MOS transistor M4, respectively.

The switching power supply comprises a high-voltage filter capacitor.

A terminal L of the AC power source is connected with a junction between the MOS transistor M1 and the MOS transistor M3 in the zero-power-consumption voltage regulation circuit via the capacitor C1, and a junction between the MOS transistor M2 and the MOS transistor M4 is floated, a terminal N of the AC power source is connected with a ground wire of the zero-power-consumption controller via a Vdd storage capacitor C3;

the Vdd storage capacitor C3 is connected sequentially to a diode D1 and a Vdd winding (T1_Na) of a transformer of the switching power supply.

Figure 5:
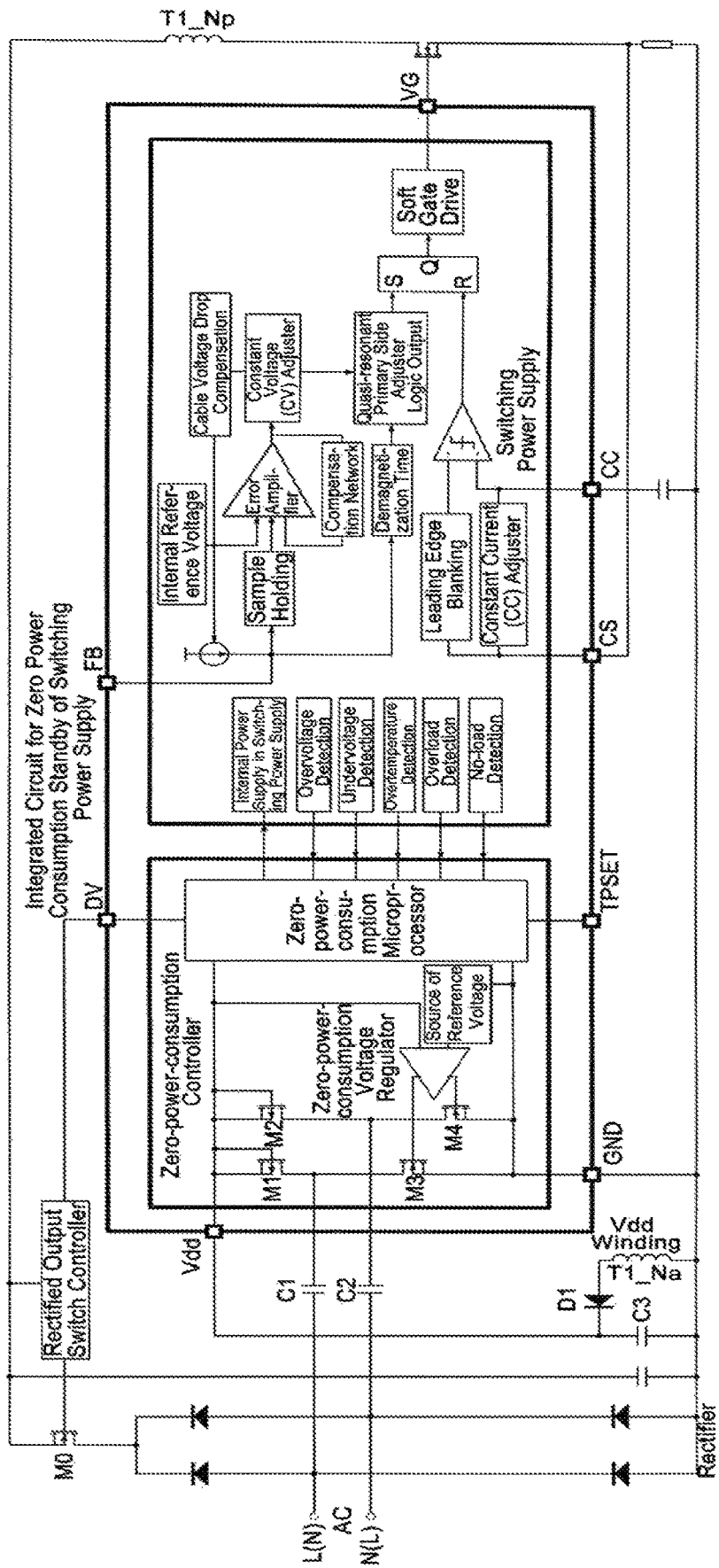
FIG. 5 is a circuit diagram applied to an embodiment of the present disclosure, according to an embodiment of the present disclosure.

As shown in FIG. 5, further, a capacitor C2 may be further included in the present disclosure, wherein the capacitor C2 has one end connected with the terminal N of the AC power source, and the other end connected with the junction between the MOS transistor M2 and the MOS transistor M4.

The operating principle of the integrated circuit for realizing a zero power consumption standby of switching power supply according to an embodiment of the present disclosure will be described below.

In the case where only the capacitor C1 is included:

When the power source is energized, since a Vdd voltage has not been established, the two pairs of MOS transistors are all in an OFF state; during a positive half cycle of an alternating current, a positive charge of the terminal L of the AC power source flows through the capacitor C1 into a p-type active region and an n-well of the MOS transistor M1 in the zero-power-consumption controller, and then passes through the Vdd storage capacitor C3, and finally flows back to the terminal N of the AC power source so as to charge the Vdd storage capacitor C3.

During a negative half cycle of the alternating current, a negative charge of the terminal L of the AC power source flows through the capacitor C1 into an n-type active region and a p-well of the MOS transistor M3 in the zero-power-consumption controller, and then flows back to the terminal N of the AC power source, and at the same time voltage stabilization control is performed by the zero-power-consumption voltage regulator in the zero-power-consumption controller by the MOS transistor M3 and the MOS transistor M4 constituting a closed loop.

In the case where the capacitors C1 and C2 are included:

When the power source is energized, since a Vdd voltage has not been established, the two pairs of MOS transistors are all in an OFF state; during a positive half cycle of an alternating current, a positive charge of the terminal L of the AC power source flows through the capacitor C1 into a p-type active region and an n-well of the MOS transistor M1 in the zero-power-consumption controller, and then passes through the Vdd storage capacitor C3, and a p-well and an n-type active region of the MOS transistor M4, and finally flows back to the terminal N of the AC power source so as to charge the Vdd storage capacitor C3.

During a negative half cycle of the alternating current, a positive charge of the terminal N of the AC power source flows through the capacitor C2 into a p-type active region and an n-well of the MOS transistor M2 in the zero-power-consumption controller, and then flows back to the terminal L of the AC power source through the Vdd storage capacitor C3 and through a p-well and an n-type active region of the MOS transistor M3 so as to charge the Vdd storage capacitor C3, and at the same time voltage stabilization control is performed by the zero-power-consumption voltage regulator in the zero-power-consumption controller by the MOS transistor M3 and the MOS transistor M4 constituting a closed loop.

When the Vdd voltage reaches a set value of the zero-power-consumption controller, an instruction is sent by the zero-power-consumption controller to start the switching power supply, the switching power supply is started normally and brought into an operating state and supplies power to a load, and at the same time the Vdd winding of the transformer of the switching power supply supplies power to the Vdd storage capacitor C3 via a diode D1, the zero-power-consumption voltage regulator in the zero-power-consumption controller controls the MOS transistor M3 and the MOS transistor M4 to be turned ON, and the capacitors C1 and C2 and the junctions of the two pairs of MOS transistors are connected with the ground terminal of the zero-power-consumption controller circuit, so that charging of the Vdd storage capacitor C3 by the capacitors C1 and C2 is stopped, and the Vdd voltage is supplied and maintained by the Vdd winding of the switching power supply.

When the switching power supply is started, if the switching power supply condition detector detects any one or more abnormalities of overvoltage or undervoltage of the power supply voltage, over temperature of a chip in the zero-power-consumption controller, and an overload or no-load state of the circuit, the switching power supply is immediately controlled by the zero-power-consumption microprocessor to stop operating.

The integrated circuit for realizing a zero power consumption standby of switching power supply further comprises a high-voltage MOS transistor (hereinafter denoted as M0) and a rectifier, wherein the rectifier is connected with the high-voltage MOS transistor M0, the high-voltage MOS transistor M0 is also connected with the high-voltage filter capacitor C4, and the high-voltage MOS transistor M0 is also connected with the switching power supply.

The zero-power-consumption controller controls the transistor M0 according to the operating requirements of the switching power supply to charge the high-voltage filter capacitor C4 with an output from the rectifier; each time the switching power supply is started, the high-voltage MOS transistor M0 is turned on, so that the rectifier charges the high-voltage filter capacitor C4 of the switching power supply, whereby a gate of the high-voltage MOS transistor M0 of the switching power supply is driven immediately after the switching power supply is started, thereby achieving soft startup.

Figure 7:
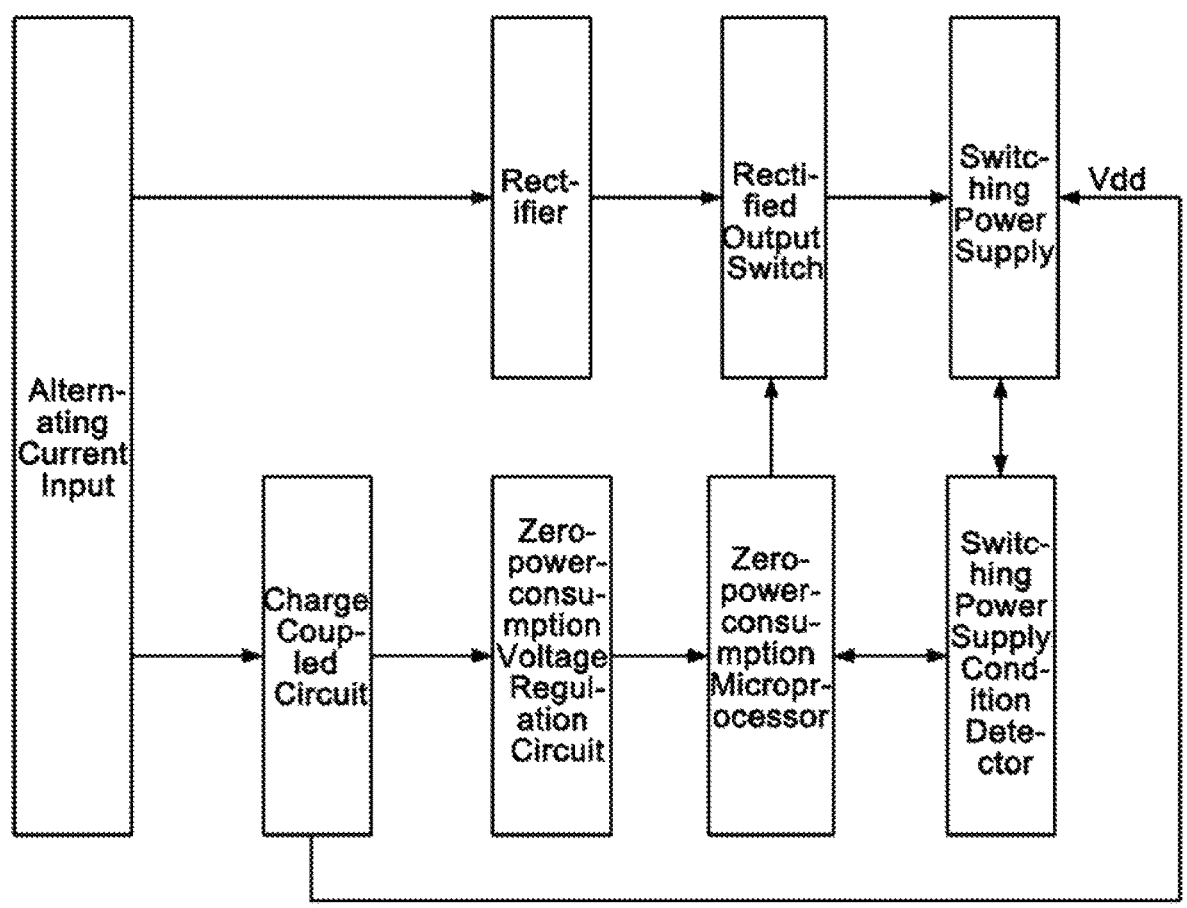
FIG. 7 is a circuit flowchart according to an embodiment of the present disclosure.

As an implementation of an embodiment of the present disclosure, the embodiment of the present disclosure provides an integrated circuit for realizing a zero power consumption standby of switching power supply, which comprises a zero-power-consumption controller configured to control the switching power supply (as shown in FIG. 7).

The zero-power-consumption controller comprises a charge coupled circuit, a zero-power-consumption microprocessor, and a zero-power-consumption voltage regulation circuit, and an input from an AC power source is sequentially fed into the zero-power-consumption voltage regulation circuit and the zero-power-consumption microprocessor via the charge coupled circuit.

As shown in FIG. 5, two terminals L and N of the AC power source are connected with junctions of two pairs of MOS transistors via two capacitors C1 and C2 of the charge coupled circuit, respectively. When the power supply is energized, since a Vdd voltage has not been established, the two pairs of MOS transistors are all in an OFF state.

During a positive half cycle of an alternating current, a positive charge of the terminal L (or N) of the AC power source passes through the capacitor C1→a p-type active region and an n-well of the MOS transistor M1 in the silicon chip→the Vdd storage capacitor C3→a p-well and an n-type active region of the MOS transistor M4 and finally flows back to the terminal N (or L) of the AC power source to charge the Vdd storage capacitor C3.

During a negative half cycle of the alternating current, the positive charge of the terminal N (or L) of the AC power source passes through the capacitor C2→a p-type active region and an n-well of the MOS transistor M2 in the silicon chip→the Vdd storage capacitor C3→a p-well and an n-type active region of the MOS transistor M3 and flows back to the terminal L (or N) of the AC power source to charge the Vdd storage capacitor C3.

When the switching power supply is started normally and brought into an operating state and supplies power to a load, the Vdd winding (T1_Na) of the transformer of the switching power supply supplies power to the Vdd storage capacitor C3 via an external diode. The zero-power-consumption voltage regulator in the chip controls the MOS transistor M3 and the MOS transistor M4 to be turned ON, and the capacitors C1 and C2 and the junctions of the two pairs of MOS transistors are connected with the ground terminal of the chip circuit, so that the charging of the Vdd storage capacitor by C1 and C2 is stopped.

The Vdd voltage is supplied and maintained by the Vdd winding of the switching power supply. Because the MOS transistor M3 and the MOS transistor M4 have a resistance at a milliohm-scale in the ON state, it can be considered that the capacitors C1 and C2 are physically pure capacitors connected directly in series which are respectively connected in parallel to the terminal L and the terminal N of the AC power source. In the pure capacitor circuit with the capacitors C1 and C2 connected in series, the phase of an alternating current i is in advance of the phase of an AC voltage v across its both ends by 90°, with an active power P=iv cos φ=iv cos 90°=0, therefore the current passing through the capacitors C1 and C2 is a reactive current, by which no electric energy is consumed.

As another implementation of the embodiment of the present disclosure, as shown in FIG. 6, the difference from the above description is that the alternating current charge is inputted by using only one capacitor C1. One terminal L (or N) of the AC power source is connected via the capacitor C1 to the junction between one of the two pairs of MOS transistors in the chip. The junction between the other pair of MOS transistors is floated, and the other terminal N (or L) of the AC power source is connected directly to the ground terminal of the chip. Only one diode is required for use in the high voltage rectification of the switching power supply.

As shown in FIG. 6, in operating procedures of this embodiment, when the power supply is energized, since a Vdd voltage has not been established, the two pairs of MOS transistors are all in an OFF state. During a positive half cycle of the alternating current, a positive charge of the terminal L (or N) of the AC power source passes through the capacitor C1→a p-type active region and an n-well of the MOS transistor M1 in the silicon chip→the Vdd storage capacitor C3 and finally flows back to the terminal N (or L) of the AC power source to charge the Vdd storage capacitor C3. During a negative half cycle of the alternating current, a negative charge of the terminal L (or N) of the AC power source passes through the capacitor C1→an n-type active region and a p-well of the MOS transistor M3 in the silicon chip and flows back to the terminal N (or L) of the AC power source.

When the switching power supply is started normally and brought into an operating state and supplies power to a load, the Vdd winding T1_Na of the transformer of the switching power supply supplies power to the Vdd storage capacitor C3 via an external diode. The zero-power-consumption voltage regulator controls the MOS transistor M3 and the MOS transistor M4 to be turned ON, and the capacitor C1 and the junction between one of the two pairs of MOS transistors are connected with the ground terminal of the zero-power-consumption controller circuit, so that the charging of the Vdd storage capacitor by the capacitor C1 is stopped, and the Vdd voltage is supplied and maintained by the Vdd winding of the switching power supply. Because the MOS transistor M3 and the MOS transistor M4 have a resistance at a milliohm-scale in the ON state, the phase of an alternating current i in the pure capacitor circuit of C1 is in advance of the phase of an AC voltage v across its both ends by 90°, with an active power P=iv cos φ=iv cos 90°=0, where φ represents a phase angle, therefore the current flowing through the capacitor C1 is a reactive current, by which no electric energy is consumed.

Figure 1:
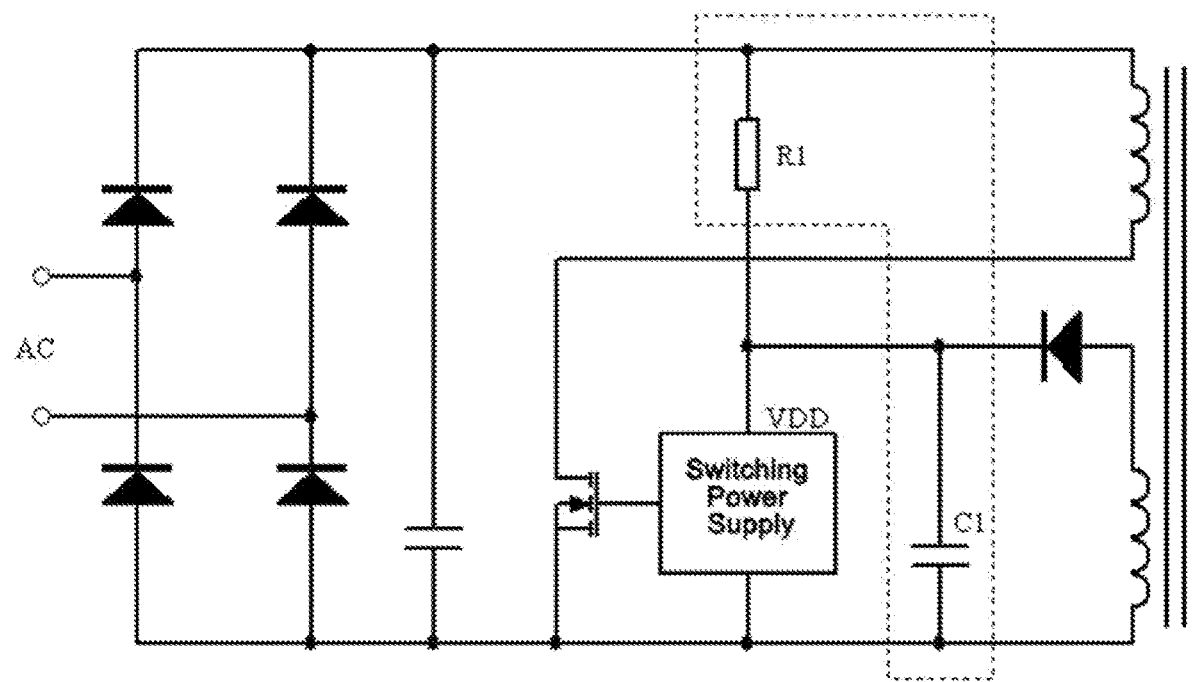
FIG. 1 is a schematic diagram of a resistor-based starting circuit for an existing conventional switching power supply.
Figure 2:
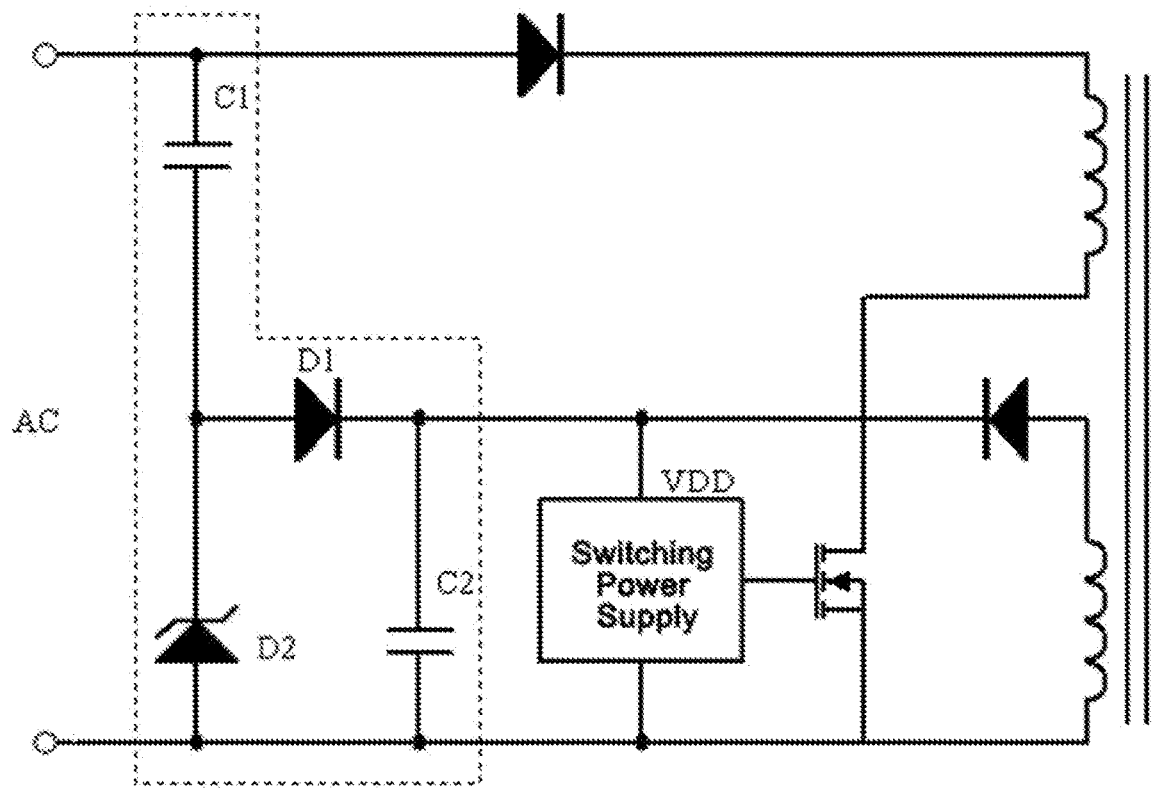
FIG. 2 is a schematic diagram of a capacitor-based starting circuit for an existing conventional switching power supply.
Figure 3:
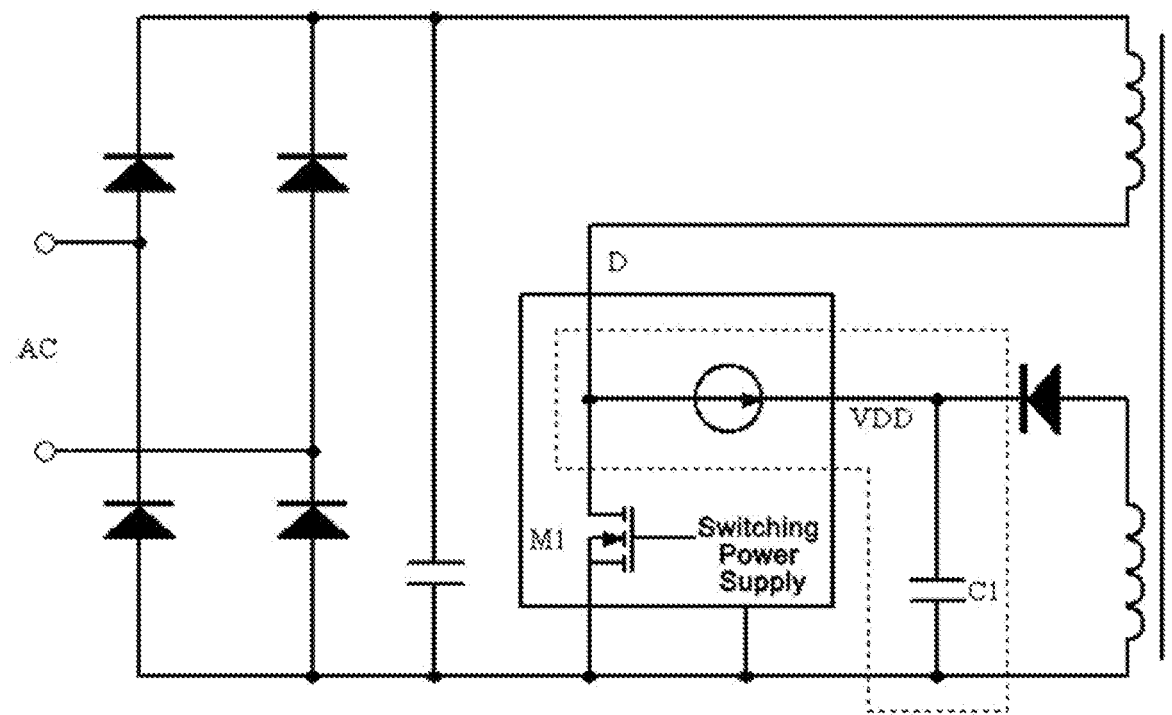
FIG. 3 is a schematic diagram of a starting circuit for an existing conventional switching power supply, in which a chip of the switching power supply sinks a current from a drain of an internal power MOSFET to charge a Vdd storage capacitor.
Figure 4:
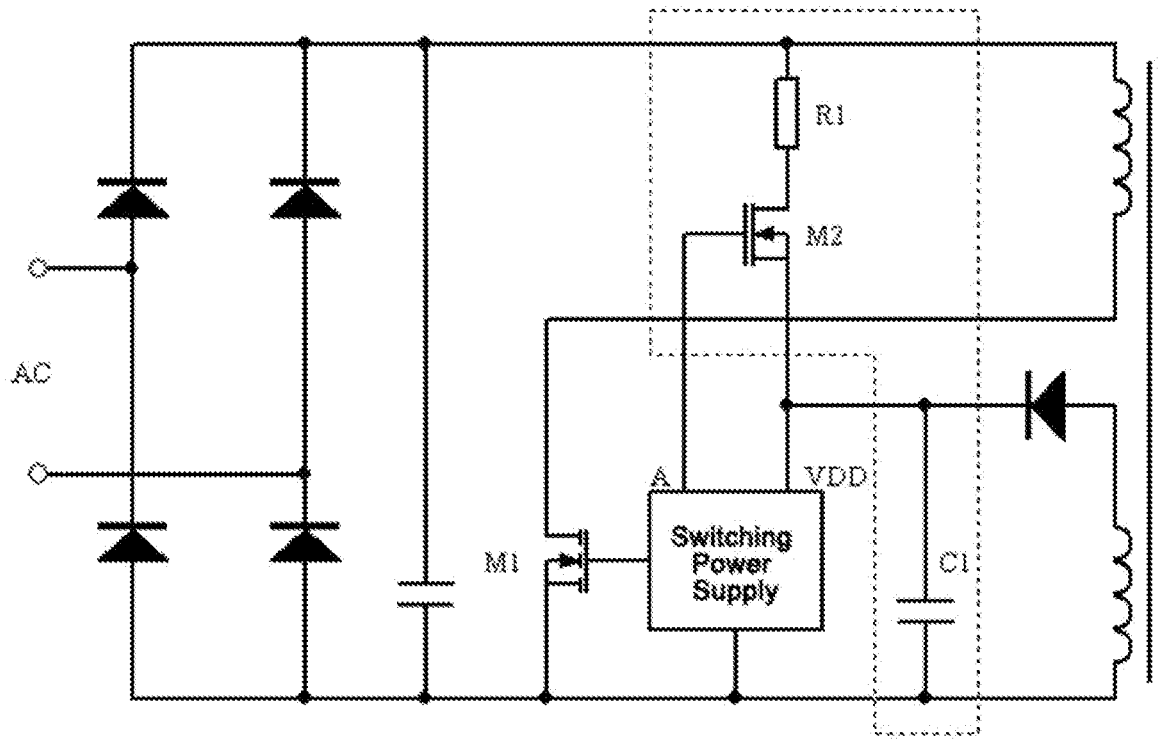
FIG. 4 is a schematic diagram of a high-voltage depletion-type field effect transistor-based starting circuit for an existing conventional switching power supply.

In the two implementation modes described above, charging of C3 by C1 (or C1 and C2 connected in series) is enabled by controlling the MOS transistor M3 and the MOS transistor M4 to be OFF, and the charging of C3 by C1 (or C1 and C2 connected in series) is disabled by causing the MOS transistor M3 and the MOS transistor M4 to be turned ON and connected in parallel to the two terminals of the AC power source. In this way, in a case where the zero-power-consumption controller in the chip controls the MOS transistor M3 and the MOS transistor M4 to be switched from OFF to ON, a drain voltage of the transistors M3 and M4 drops only from Vdd (generally about 10V to 20V) to 0V, or when M3 and M4 are switched from ON to OFF, the drain voltage rises only from 0V to Vdd (generally about 10V to 20V). Because the voltage has a very narrow dynamic range, high switching power consumption will not be generated even in case of frequent operations. This control mode is not only superior to the conventional resistor-based starting mode (FIG. 1), the conventional capacitor-based starting mode (FIG. 2), and the conventional starting circuit in which a chip of the switching power supply sinks a current from a drain of an internal power MOSFET to charge a Vdd storage capacitor (FIG. 3), but also superior to the mode in which the charging circuit (loop) is cut off by a high voltage electronic component to save power consumed by the starting circuit (FIG. 4). In FIG. 4, when the high-voltage transistor M2 is switched from ON to OFF, its dynamic drain voltage rises from Vdd (generally about 10V to 20V) to 300V. Since this wide dynamic range from ON to OFF defines a slope with time, a switching loss inevitably occurs, and the loss is larger especially when it is necessary to frequently shut down and start the switching power supply for some reasons (for example when there is no load).

In the two implementation modes described above, during the operation, voltage stabilization control is performed by the zero-power-consumption voltage regulator in the chip by the MOS transistor M3 and the MOS transistor M4 constituting a closed loop. When the Vdd voltage reaches the set value of the zero-power-consumption controller in the chip, and the zero-power-consumption microprocessor built in the chip does not find through detection that an abnormality occurs in overvoltage detection, undervoltage detection, overload detection, and over temperature detection, an instruction is sent by the zero-power-consumption controller to start the switching power supply. If the built-in zero-power-consumption microprocessor detects through detection that an abnormality occurs in overvoltage detection, undervoltage detection, overload detection, and overtemperature detection, or detects that the output of the switching power supply is unloaded, processing is performed in accordance with the procedures set in the zero-power-consumption microprocessor until the switching power supply is brought into a normal operating state.

Figure 8:
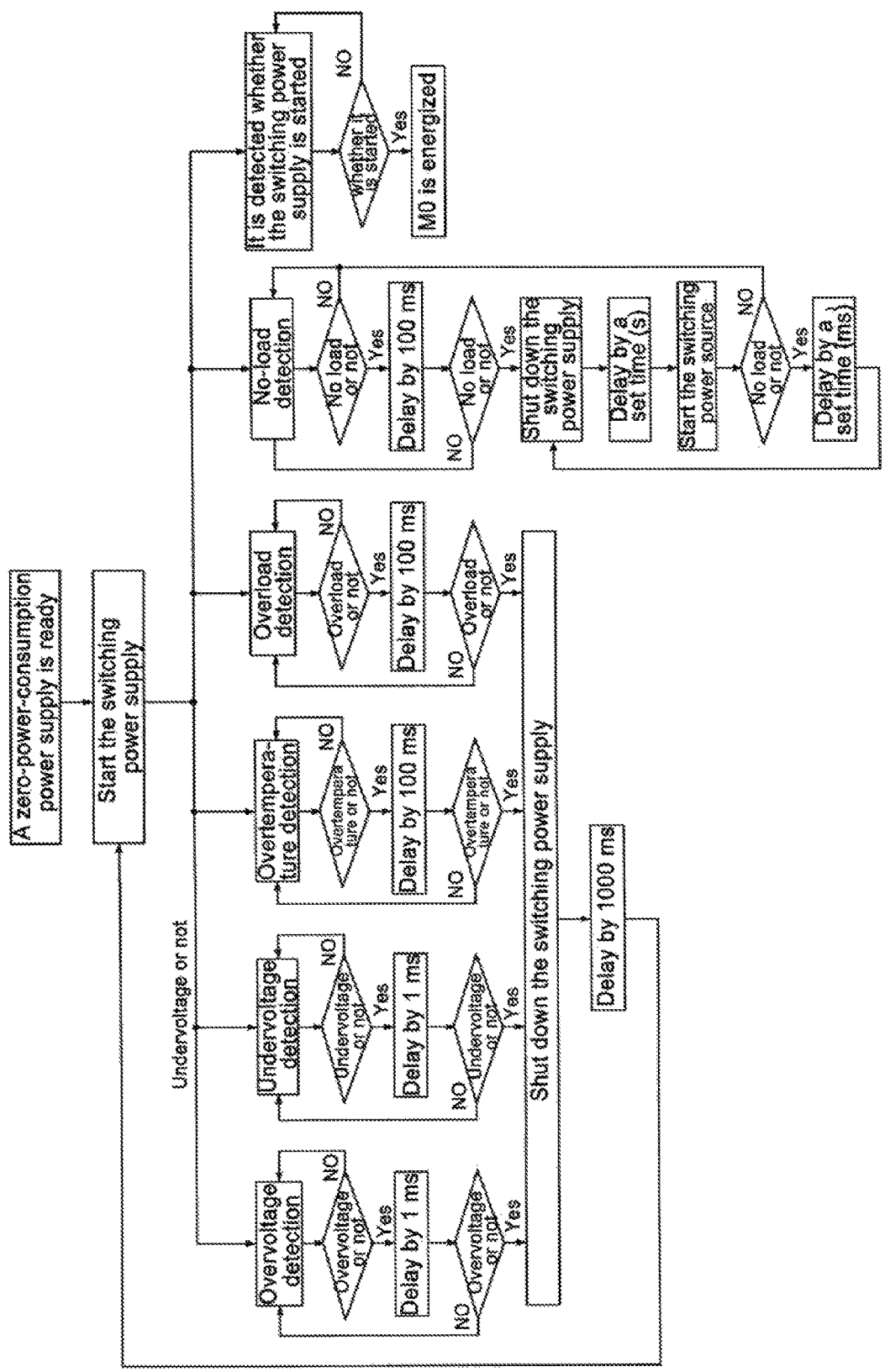
FIG. 8 is a flowchart illustrating operation of a safety detection module according to an embodiment of the present disclosure.

The technical solution of the present disclosure has a further advantage that is absent in all the other startup modes of switching power supply. That is to say, in the conventional startup modes of switching power supply, only startup (i.e., charging of a storage capacitor) is possible, while a voltage source cannot be established by itself. In the technical solution of the present disclosure, not only the object of starting the switching power supply is reliably accomplished, but also the more important characteristic is that the zero-power-consumption controller can establish a voltage source using the zero-power-consumption voltage regulation circuit as needed regardless of whether the switching power supply is in an operating state or a shutdown state, so that the zero-power-consumption controller can manage the entire switching power supply. Continuous operation after the completion of startup of the switching power supply allows the dedicated zero-power-consumption microprocessor to monitor multiple parameters of the switching power supply, such as overvoltage and undervoltage of the power supply voltage, over temperature of the chip, over load and no load. For example, when any one or more abnormalities of overvoltage or undervoltage, overtemperature, and overload are detected, the switching power supply is immediately controlled by the zero-power-consumption microprocessor to stop operating so as to ensure a safe and power-saving switching power supply system. In the case where the switching power supply stops operating, the abnormal parameters are accessed and monitored periodically. If the respective parameters are found to return to normal, the normal operation of the switching power supply is resumed immediately (see FIG. 8, which is a flowchart of the microprocessor circuit).

The zero-power-consumption controller according to the embodiment of the present disclosure is operated by using the characteristic that the switching power supply has a large output electrolytic capacitor (generally at thousands of microfarads) and has a very slowly self-discharged voltage and can maintain a constant voltage for tens of seconds or even longer when there is no load or the charging is disabled. When no load is detected, the switching power supply is immediately shut down by the zero-power-consumption microprocessor, so that the switching power supply maintains the original output voltage while consuming no power completely, and the switching power supply is started periodically based on a discharge time constant in a no-load state of the output capacitor of the switching power supply and based on the requirement for accuracy of stabilization of the output voltage in the no-load state so as to supplement the lost charges to the output capacitor to maintain a constant voltage at the output terminal. In this way, the switching power supply stops operating for a long time (at a second-scale), whereas the switching power supply is started for supplementing charges to the output capacitor for a very short time (of the order of magnitude of milliseconds), and the switching power supply is substantially in a non-operated state, therefore the entire switching power supply consumes almost zero power on average, and zero power consumption is achieved when the switching power supply is in a no-load standby state.

In order to further eliminate power consumption caused by electric leakage that might occur in the high-voltage filter capacitor of the switching power supply (in fact, even a qualified non-defective high-voltage electrolytic capacitor has a certain phenomenon of electric leakage at a voltage of one hundred volts or more (even if a current of only 1 $\mu A$ is leaked, electric energy of 300 $\mu W$ is lost in the case of 300 V), when the switching power supply stops operating, the zero-power-consumption controller in the technical solution of the present disclosure controls the high-voltage MOS transistor (M0 in FIG. 5, M0 in FIG. 6) to disable power supply to the high-voltage electrolytic capacitor by the rectified output, and a high-voltage DC power source formed by rectifying the AC power source is energized in real time when the switching power supply starts operating, which is especially important for realizing zero power consumption standby in a no-load standby state and slight power consumption standby.

The incorporation of M0 allows the zero-power-consumption circuit in the technical solution of the present disclosure to maintain the voltage across the Vdd storage capacitor. Each time the switching power supply is started, M0 is enabled so that the high voltage rectifier charges the high-voltage filter capacitor of the switching power supply, where the voltage U(t) across the high voltage capacitor=$U\hat{}(-t/\tau)$ ($\tau$ is a RC time constant). The gate of the high-voltage MOS transistor M0 of the switching power supply is driven immediately upon the switching power supply is started immediately (without need of waiting for charging of Vdd), and the high voltage across the drain of the MOS transistor M0 should increase exponentially according to the above formula, so that real soft startup can be achieved each time the switching power supply is started, and parameters related to the soft startup can be set by adjusting the RC time constant, which is also unachievable by the hard switching of the conventional switching power supplies. In order to achieve a softer startup, the conventional switching power supplies have to adjust the driven pulse width of the gate from narrow to wide as compensation when being driven initially.

The MOS transistors M1 and M2 in FIG. 5 of the technical solution of the present disclosure may be replaced with any other unidirectionally conductive electronic component depending on the requirements of different processes, as long as the directions of the p-type semiconductors and the n-type semiconductors are consistent with those described in this technical solution.

An embodiment of the present disclosure also provides an integrated circuit for realizing a zero power consumption standby of switching power supply, comprising a zero-power-consumption controller configured to control the switching power supply, wherein the zero-power-consumption controller comprises a charge coupled circuit, a zero-power-consumption microprocessor, a zero-power-consumption voltage regulation circuit, and a switching power supply condition detector, wherein an AC power source is connected with the charge coupled circuit, the charge coupled circuit is connected with the zero-power-consumption voltage regulation circuit, the voltage regulation circuit is connected with the zero-power-consumption microprocessor, the zero-power-consumption microprocessor is connected with the switching power supply condition detector, the switching power supply condition detector is connected with the switching power supply, and an input from the AC power source is sequentially fed into the zero-power-consumption voltage regulation circuit, the zero-power-consumption microprocessor, and the switching power supply condition detector via the charge coupled circuit.

As an optional embodiment, the charge coupled circuit comprises a first capacitor C1 and a third capacitor C3, the zero-power-consumption voltage regulation circuit comprises a first pair of MOS transistors, a second pair of MOS transistors, a zero-power-consumption voltage regulator, and a source of reference voltage, wherein the first pair of MOS transistors comprises a first MOS transistor M1 and a third MOS transistor M3, the second pair of MOS transistors comprises a second MOS transistor M2 and a fourth MOS transistor M4, a first terminal of the AC power source is connected with one end of the first capacitor C1, the other end of the first capacitor C1 is connected with a junction between the first pair of MOS transistors, a junction between the second pair of MOS transistors is floated, a second terminal of the AC power source is connected with a ground wire of the zero-power-consumption controller via the third capacitor C3, the zero-power-consumption controller is configured to be connected with the switching power supply, the third capacitor C3 is connected sequentially to a first diode D1 and a winding of a transformer the switching power supply, and the source of reference voltage is connected with the zero-power-consumption microprocessor.

As an optional embodiment, the switching power supply comprises a high-voltage filter capacitor.

As an optional embodiment, the charge coupled circuit further comprises a second capacitor C2, wherein one end of the second capacitor C2 is connected with the terminal N of the AC power source, and the other end of the second capacitor C2 is connected with the junction between the second MOS transistor M2 and the fourth MOS transistor M4.

As an optional embodiment, the integrated circuit for realizing a zero power consumption standby of switching power supply further comprises a high-voltage MOS transistor M0 and a rectifier, wherein the rectifier is connected with the high-voltage MOS transistor M0, the high-voltage MOS transistor M0 is also connected with the high-voltage filter capacitor, and the high-voltage MOS transistor M0 is also connected with the switching power supply.

The technical solution of the present disclosure is applicable to switching power supplies of various types and various power levels, such as mobile phone chargers. Either a wired mobile phone charger or a wireless mobile phone charger may be plugged into a socket all the time, a mobile phone is automatically charged when the mobile phone is detected, and the power is automatically cut off when the battery is fully charged. Not only the battery of the mobile phone is deenergized to protect the battery from being damaged due to overcharging, but also the chip and the high-voltage rectification part of the switching power supply are deenergized to completely prevent unsafe factors, such as aging of the device caused by its connection to a high voltage for a long time, drying up of the capacitor electrolyte, or even overheating or firing. Another example is directed to high-power chargers for electric vehicle. Electric vehicles are generally scheduled to be charged at night, and overcharging is very harmful to both lead-acid batteries and lithium batteries and is very dangerous. Since the charger operates in a high-power state, overcharging affects the service life of the charger in a less severe case, and may cause an accident in a severe case. A charger using the integrated circuit for realizing a zero power consumption standby of switching power supply according to the technical solution of the present disclosure completely cuts off the power source of the charger after the battery is fully charged, so that not only the battery but also the charger is protected. The examples also include power converters commonly used in various types of electrical appliances. When the power converter is still plugged into the socket after the host is powered off, the zero-power-consumption integrated circuit detects that the host is powered off, so that the switching power supply is shut down and brought into a standby state with zero power consumption (the output capacitor of the switching power supply is kept at the original output voltage). When the host is powered on, the power converter is immediately brought into an operating state and outputs and supplies power to the host.

The technical solutions proposed in the present disclosure can also be widely used in various types of devices using alternating currents, such as home appliances including televisions, audio devices, air conditioners, microwave ovens, etc.; office equipment including computers, fax machines, printers, copying machines, etc., and various types of electrical equipment in the industry.

The zero power consumption standby of switching power supply according to the present disclosure can be widely used and popularized for the following:

for people, not only unnecessary economic waste can be saved. Because each family has a dozen to dozens of devices of various sizes that consume electricity even during standby, the total amount of power consumption in society is very huge when calculated in terms of more than one billion people in China and several billions of people in the world. When all the devices are changed into eco-friendly devices that do not waste electric energy during standby, it is possible for people to build less power plants and combust a less amount of coal and oil (in tons), carbon dioxide emissions can be greatly reduced, and safety accidents can be greatly reduced, which has been excepted by people for a long time. It is believed that the standard of power consumption during standby in China and in the world can be advanced to the highest level "0" by popularization and use of this invention.

The present disclosure provides an integrated circuit for realizing a zero power consumption standby of switching power supply. There are many methods and approaches to implement this technical solution. The above description is only illustrative of preferred embodiments of the present disclosure. It should be noted that several improvements and modifications may be made by those of ordinary skill in the art without departing from the principle of the present disclosure, and such improvements and modifications should also be considered to be within the scope of protection of the present disclosure. All the components that are not clearly described in this embodiment can be implemented by the prior art.

INDUSTRIAL APPLICABILITY

The present disclosure discloses an integrated circuit for realizing a zero power consumption standby of switching power supply, comprising a zero-power-consumption controller configured to control the switching power supply. The zero-power-consumption controller comprises a charge coupled circuit, a zero-power-consumption microprocessor, and a zero-power-consumption voltage regulation circuit, and an input from an AC power source is sequentially fed into the zero-power-consumption voltage regulation circuit and the zero-power-consumption microprocessor via the charge coupled circuit, so that the switching power supply can achieve zero power consumption standby, and all the electrical devices to which the present disclosure are applicable can achieve the zero power consumption standby.

What is claimed is:

1. A zero-power-consumption controller comprising a charge coupled circuit, a zero-power-consumption microprocessor, and a zero-power-consumption voltage regulation circuit, wherein the charge coupled circuit comprises a first capacitor and a third capacitor, the zero-power-consumption voltage regulation circuit comprises two pairs of MOS transistors, a zero-power-consumption voltage regulator, and a source of reference voltage, wherein the first pair of MOS transistors comprises a first MOS transistor and a third MOS transistor, the second pair of MOS transistors comprises a second MOS transistor and a fourth MOS transistor, a first terminal of an AC power source is connected with a junction between the first MOS transistor and the third MOS transistor in the zero-power-consumption voltage regulation circuit via the first capacitor, a junction between the second MOS transistor and the fourth MOS transistor is floated, a second terminal of the AC power source is connected with a ground terminal of the zero-power-consumption controller via the third capacitor, the third capacitor is connected sequentially to a diode and a Vdd winding of a transformer of the switching power supply, and an input from the AC power source is sequentially fed into the zero-power-consumption voltage regulation circuit and the zero-power-consumption microprocessor via the charge coupled circuit.

2. The zero-power-consumption controller according to claim 1, further comprising a switching power supply condition detector, wherein the switching power supply condition detector is connected with the switching power supply, and an input from the AC power source is sequentially fed into the zero-power-consumption voltage regulation circuit, the zero-power-consumption microprocessor, and the switching power supply condition detector via the charge coupled circuit.

3. An integrated circuit for realizing a zero power consumption standby of switching power supply comprising the zero-power-consumption controller according to claim 2.

4. The integrated circuit for realizing a zero power consumption standby of switching power supply according to claim 3, wherein the source of reference voltage is connected with the zero-power-consumption microprocessor.

5. The integrated circuit for realizing a zero power consumption standby of switching power supply according to claim 4, wherein the switching power supply comprises a high-voltage filter capacitor.

6. The integrated circuit for realizing a zero power consumption standby of switching power supply according to claim 5, wherein the integrated circuit for realizing a zero power consumption standby of switching power supply further comprises a high-voltage MOS transistor and a rectifier, the rectifier is connected with the high-voltage MOS transistor, the high-voltage MOS transistor is also connected with the high-voltage filter capacitor, and the high-voltage MOS transistor is also connected with the switching power supply.

7. The integrated circuit for realizing a zero power consumption standby of switching power supply according to claim 5, wherein the charge coupled circuit further comprises a second capacitor, one end of the second capacitor is connected with the terminal N of the AC power source, and the other end of the second capacitor is connected with the junction between the second MOS transistor and the fourth MOS transistor.

8. The integrated circuit for realizing a zero power consumption standby of switching power supply according to claim 6, wherein the integrated circuit for realizing a zero power consumption standby of switching power supply further comprises a high-voltage MOS transistor and a rectifier, the rectifier is connected with the high-voltage MOS transistor, the high-voltage MOS transistor is also connected with the high-voltage filter capacitor, and the high-voltage MOS transistor is also connected with the switching power supply.

9. An integrated circuit for realizing a zero power consumption standby of switching power supply comprising the zero-power-consumption controller according to claim 1.

10. The integrated circuit for realizing a zero power consumption standby of switching power supply according to claim 9, wherein the zero-power-consumption controller can establish a voltage source using the zero-power-consumption voltage regulation circuit as needed, regardless of whether the switching power supply is in an operating state or a shutdown state, so that the zero-power-consumption controller can manage the entire switching power supply.

11. The integrated circuit for realizing a zero power consumption standby of switching power supply according to claim 9, wherein when no load is detected, the switching power supply is immediately shut down by the zero-power-consumption microprocessor, so that the switching power supply maintains an original output voltage while consuming no power completely; the switching power supply is started periodically based on a discharge time constant in a no-load state of an output capacitor of the switching power supply and based on a requirement for accuracy of stabilization of an output voltage in the no-load state so as to supplement the lost charges to the output capacitor to maintain a constant voltage at the output terminal; in this way, the switching power supply stops operating for a long time at a second-scale, whereas the switching power supply is started for supplementing charges to the output capacitor for a very short time at a millisecond-scale, and the switching power supply is substantially in a non-operated state, therefore the entire switching power supply consumes almost zero power on average, and thus zero power consumption is achieved when the switching power supply is in a no-load standby state.

12. The integrated circuit for realizing a zero power consumption standby of switching power supply according to claim 9, further comprising a high-voltage MOS transistor controlled by the zero-power-consumption controller, wherein the high-voltage MOS transistor is operatively linked to the switching power supply; the addition of the high-voltage MOS transistor allows the zero-power-consumption circuit of the present disclosure to maintain a voltage across the third capacitor; each time the switching power supply is started, the high-voltage MOS transistor is enabled so that a high voltage rectifier charges a high-voltage filter capacitor of the switching power supply, where the voltage U(t) across the high voltage capacitor=$U\^(-t/\tau)$, $\tau$ is a RC time constant, and t represents time; a gate of the high-voltage MOS transistor of the switching power supply is driven immediately in no need of waiting for charging of Vdd upon the switching power supply is started immediately, and a high voltage across a drain of the high-voltage MOS transistor should increase exponentially according to the above formula, so that real soft startup can be achieved each time the switching power supply is started, and parameters related to the soft startup can be set by adjusting the RC time constant.

13. The integrated circuit for realizing a zero power consumption standby of switching power supply according to claim 9, wherein only one diode is used for high voltage rectification of the switching power supply; when the power source is energized, since a Vdd voltage has not been established, the two pairs of MOS transistors are all in an OFF state; during a positive half cycle of an alternating current, a positive charge of the first terminal of the AC power source flows through the first capacitor into a p-type active region and an n-well of the first MOS transistor in the zero-power-consumption controller, and then flows into the third capacitor, and finally flows back to the second terminal of the AC power source to charge the third capacitor; during a negative half cycle of the alternating current, a negative charge of the first terminal of the AC power source flows through the first capacitor into an n-type active region and a p-well of the third MOS transistor in the zero-power-consumption controller, and then flows back to the second terminal of the AC power source; charging of the third capacitor by the first capacitor is enabled by controlling the third MOS transistor and the fourth MOS transistor to be turned OFF, and the charging of the third capacitor by the first capacitor is disabled by causing the third MOS transistor and the fourth MOS transistor to be turned ON and connected in parallel to the two terminals of the AC power source; in a case where the zero-power-consumption controller controls the third MOS transistor and the fourth MOS transistor to be switched from OFF to ON, a drain voltage of the third MOS transistor and the fourth MOS transistor drops only from Vdd to 0V; or when the third MOS transistor and the fourth MOS transistor are controlled to be switched from ON to OFF, the drain voltage rises only from 0V to Vdd.

14. The integrated circuit for realizing a zero power consumption standby of switching power supply according to claim 9, wherein the first MOS transistor and the second MOS transistor can be replaced with any other unidirectionally conductive electronic component.

15. The integrated circuit for realizing a zero power consumption standby of switching power supply according to claim 9, wherein voltage stabilization control is performed by the zero-power-consumption voltage regulator in the zero-power-consumption controller by the third MOS transistor and the fourth MOS transistor constituting a closed loop; when the Vdd voltage reaches a set value of the zero-power-consumption controller, the zero-power-consumption microprocessor performs overvoltage detection, undervoltage detection, overload detection, and overtemperature detection, an instruction is sent by the zero-power-consumption controller to start the switching power supply if no abnormality is found, and the switching power supply is immediately controlled by the zero-power-consumption microprocessor to stop operating if the zero-power-consumption microprocessor detects one or more abnormalities or detects that the output of the switching power supply is unloaded; in a case where the switching power supply stops operating, abnormal parameters are accessed and monitored periodically, and normal operation of the switching power supply is resumed immediately if the respective parameters are found to return to normal.

16. The integrated circuit for realizing a zero power consumption standby of switching power supply according to claim 9, wherein when the switching power supply is started normally and brought into an operating state and supplies power to a load, a Vdd winding of a transformer of the switching power supply supplies power to the third capacitor via an external diode, the zero-power-consumption voltage regulator controls the third MOS transistor and the fourth MOS transistor to be turned ON, and the first capacitor and the junction between one pair of the two pairs of MOS transistors are connected with the ground terminal of the zero-power-consumption controller circuit, so that the charging of the third capacitor by the first capacitor is stopped, and the Vdd voltage is supplied and maintained by the Vdd winding of the switching power supply; because the third MOS transistor and the fourth MOS transistor have a resistance at a milliohm-scale in the ON state, a phase of an alternating current i in a pure capacitor circuit of the first capacitor is in advance of a phase of an AC voltage v across its both ends by 90°, with an active power P=iv cos φ=iv cos 90°=0, where φ represents a phase angle, therefore the current flowing through the first capacitor is a reactive current, by which no electric energy is consumed.

17. The integrated circuit for realizing a zero power consumption standby of switching power supply according to claim 9, further comprising a second capacitor, wherein the two terminals of the AC power source are respectively connected with junctions of the two pairs of MOS transistors in the zero-power-consumption controller via the first capacitor and the second capacitor of the charge coupled circuit; when the power source is energized, since a Vdd voltage has not been established, the two pairs of MOS transistors are all in an OFF state; during a positive half cycle of an alternating current, a positive charge of the first terminal of the AC power source flows through the first capacitor into a p-type active region and an n-well of the first MOS transistor in the zero-power-consumption controller, then flows into the third capacitor, and finally flows back to the second terminal of the AC power source via a p-well and an n-type active region of the fourth MOS transistor to charge the third capacitor; during a negative half cycle of the alternating current, a positive charge of the second terminal of the AC power source flows through the second capacitor into a p-type active region and an n-well of the second MOS transistor in the zero-power-consumption controller, then flows into the third capacitor, and then flows back to the first terminal of the AC power source via a p-well and an n-type active region of the third MOS transistor to charge the third capacitor; charging of the third capacitor by the first capacitor and the second capacitor which are connected in series is enabled by controlling the third MOS transistor and the fourth MOS transistor to be turned OFF, and the charging of the third capacitor by the first capacitor and the second capacitor connected in series is disabled by causing the third MOS transistor and the fourth MOS transistor to be turned ON and connected in parallel to the two terminals of the AC power source; in a case where the zero-power-consumption controller controls the third MOS transistor and the fourth MOS transistor to be switched from OFF to ON, a drain voltage of the third MOS transistor and the fourth MOS transistor drops only from Vdd to 0V; or when the third MOS transistor and the fourth MOS transistor are controlled to be switched from ON to OFF, the drain voltage rises only from 0V to Vdd.

18. The integrated circuit for realizing a zero power consumption standby of switching power supply according to claim 17, wherein voltage stabilization control is performed by the zero-power-consumption voltage regulator in the zero-power-consumption controller by the third MOS transistor and the fourth MOS transistor constituting a closed loop; when the Vdd voltage reaches a set value of the zero-power-consumption controller, the zero-power-consumption microprocessor performs overvoltage detection, undervoltage detection, overload detection, and overtemperature detection, an instruction is sent by the zero-power-consumption controller to start the switching power supply if no abnormality is found, and the switching power supply is immediately controlled by the zero-power-consumption microprocessor to stop operating if the zero-power-consumption microprocessor detects one or more abnormalities or detects that the output of the switching power supply is unloaded; in a case where the switching power supply stops operating, abnormal parameters are accessed and monitored periodically, and normal operation of the switching power supply is resumed immediately if the respective parameters are found to return to normal.

19. The integrated circuit for realizing a zero power consumption standby of switching power supply according to claim 17, wherein when the switching power supply is started normally and brought into an operating state and supplies power to a load, a Vdd winding of a transformer of the switching power supply supplies power to the third capacitor via an external diode, the zero-power-consumption voltage regulator controls the third MOS transistor and the fourth MOS transistor to be turned ON, and the first capacitor and the second capacitor and the junctions of the two pairs of MOS transistors are connected with the ground terminal of the zero-power-consumption controller circuit, so that the charging of the third capacitor by the first capacitor and the second capacitor is stopped, and the Vdd voltage is supplied and maintained by the Vdd winding of the switching power supply; because the third MOS transistor and the fourth MOS transistor have a resistance of the order at a milliohm-scale in the ON state, the first capacitor and the second capacitor are physically pure capacitors connected directly in series which are connected in parallel to the two terminals of the AC power source, and a phase of an alternating current i in a pure capacitor circuit with the first capacitor and the second capacitor connected in series is in advance of a phase of an AC voltage v across its both ends by 90°, with an active power P=iv cos $\varphi$=iv cos 90°=0, where $\varphi$ represents a phase angle, therefore the current passing through the first capacitor and the second capacitor is a reactive current, by which no electric energy is consumed.

20. The integrated circuit for realizing a zero power consumption standby of switching power supply according to claim 17, further comprising a high-voltage MOS transistor controlled by the zero-power-consumption controller, wherein the high-voltage MOS transistor is operatively linked to the switching power supply; the addition of the high-voltage MOS transistor allows the zero-power-consumption circuit of the present disclosure to maintain a voltage across the third capacitor; each time the switching power supply is started, the high-voltage MOS transistor is enabled so that a high voltage rectifier charges a high-voltage filter capacitor of the switching power supply, where the voltage U(t) across the high voltage capacitor=$U^{\wedge}(-t/\tau)$, $\tau$ is a RC time constant, and t represents time; a gate of the high-voltage MOS transistor of the switching power supply is driven immediately in no need of waiting for charging of Vdd upon the switching power supply is started immediately, and a high voltage across a drain of the high-voltage MOS transistor should increase exponentially according to the above formula, so that real soft startup can be achieved each time the switching power supply is started, and parameters related to the soft startup can be set by adjusting the RC time constant.

* * * * *